Figure 1:
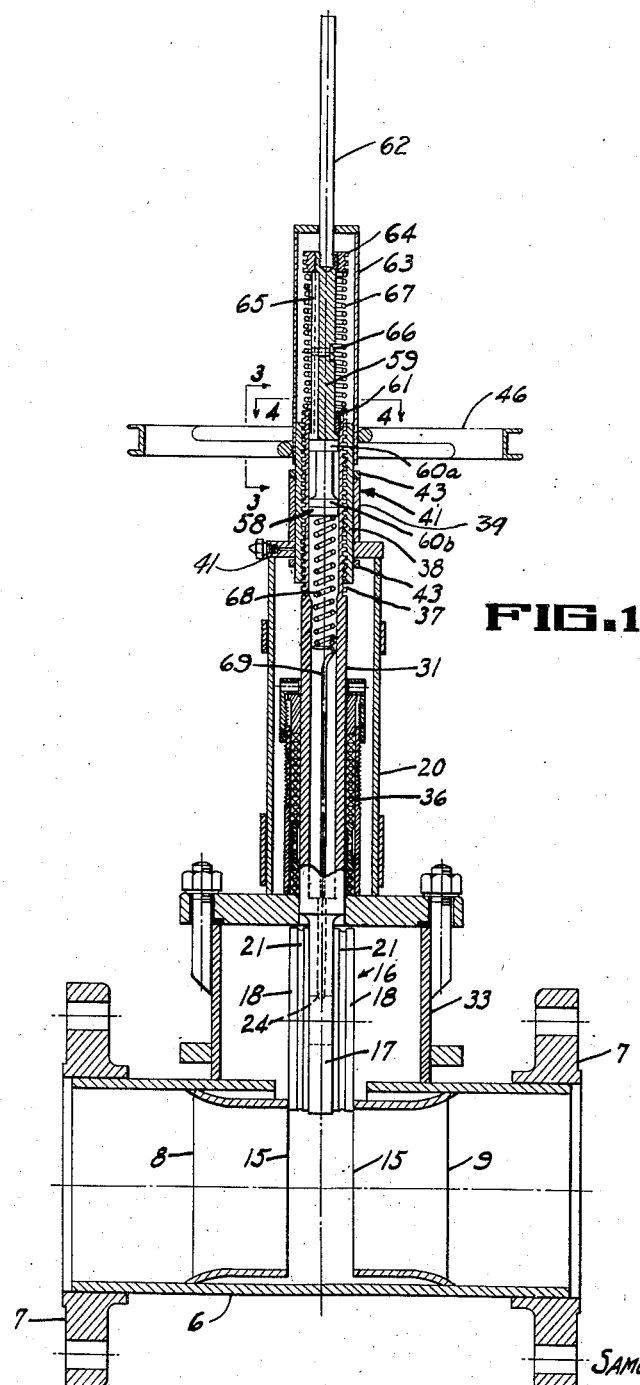

Sept. 7, 1948.　　　　S. H. EDWARDS　　　　2,448,706
VALVE

Filed June 6, 1945　　　　　　　　　　　　　　2 Sheets-Sheet 1

INVENTOR
SAMUEL H. EDWARDS
BY
Robert B. Bennett,
ATTORNEY

Sept. 7, 1948.  S. H. EDWARDS  2,448,706
VALVE

Filed June 6, 1945  2 Sheets-Sheet 2

INVENTOR
SAMUEL H. EDWARDS
BY
ATTORNEY

Patented Sept. 7, 1948

2,448,706

UNITED STATES PATENT OFFICE 2,448,706

VALVE

Samuel H. Edwards, Richmond, Calif.

Application June 6, 1945, Serial No. 597,728

7 Claims. (Cl. 251—65)

This is a continuation in part of my application Serial No. 509,971, filed November 12, 1943.

This invention relates to a valve and particularly to a novel valve construction which enables a tight shut-off to be established on both the upstream and the downstream side of the valve. This is a feature of considerable advantage. For example, in cyclic catalytic reforming plants it is necessary to cut off fluid flow positively, for slight leaks from either side of the valve to the other side, or from either side of the valve to the atmosphere, are extremely hazardous. The valve of the present invention also enables a tight shut-off to be established even though the valve is under mechanical strain or if one side of the valve is at a materially different temperature from the other side.

Briefly, the valve of the present invention includes the usual valve body. Valve seats are provided in this body on the upstream and downstream sides. A gate is movable across these seats to control flow of fluid. The gate structure is novel in that it includes two seating members, one for each valve seat, although only one need be employed for certain uses. The seating members are carried upon the gate by flexible bellows; when a fluid under pressure is admitted to the interior of the gate, the movable seating members are moved positively to engage the seats. The gate can be moved across the valve seats from an open to a closed position by manual manipulation of a hand wheel cooperating with a screw thread on the valve stem. Upon continued rotation of the hand wheel, a piston is moved in a cylinder to force a fluid to move the seating members positively to engage the valve seats. Preferably the pressure created is greater than that ever likely to be present in the line so the valve provides a positive closure. Admission of the fluid to expand the gate can only occur when the gate is in its lowermost position. This feature is desirable to insure that the expandable gate is not damaged by expansion prior to lowering of the gate into its closed position. It will be obvious that the operating force required to open the valve is very little, particularly if the valve is under pressure from a fluid in the line. When it is desired to open the valve, the hand wheel is turned in the opposite direction. Its initial period of rotation is effective to retract the movable members. Further rotation results in lifting of the gate. The use of the hand wheel is advantageous for only a single operating means is thereby provided, one which is usual to gate valve operation.

It is the general broad object of the present invention to provide a novel, fluid-control expanding gate valve of the wheel operated type.

A further object of the present invention is to provide a simple, rugged gate valve structure which can be expanded by a fluid in cooperation with a suitable valve body and valve seat.

The invention includes other objects and features of advantage, some of which, together with the foregoing, will appear hereinafter wherein the present preferred form of valve structure of this invention is disclosed.

Figure 2:
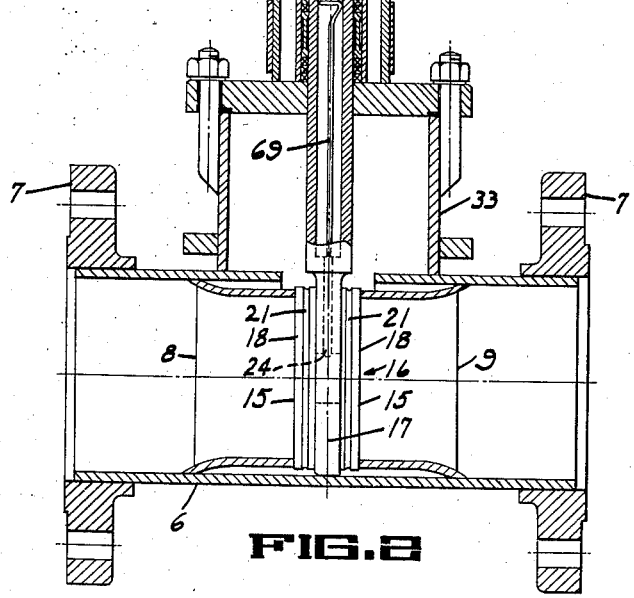

In the drawing accompanying and forming a part hereof, Figures 1 and 2 are sections taken through the valve body, the figures respectively illustrating the valve in open and closed position.

Figure 3:
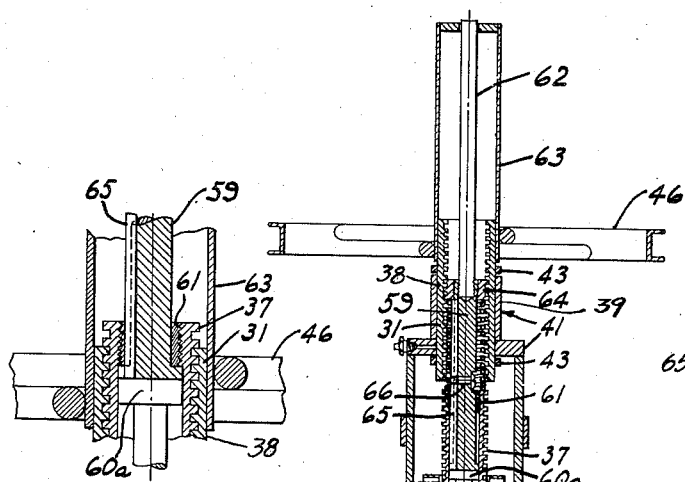
Figure 4:
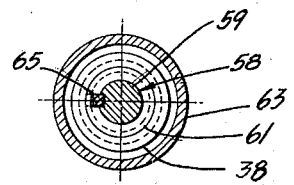

Figure 3 is an enlarged section of the end of the valve stem. Figure 4 is a section along the line 4—4 of Figure 1.

Referring to the drawings, numeral 6 indicates a valve body having flanges 7 thereon enabling the body to be installed in a pipe line. Valve seats 8 and 9 are provided in the valve body, these being inserted and welded in place. Each valve seat has a seating portion 15 formed thereon. I prefer that these seating portions be parallel to each other; if desired they can be at a slight angle to each other to provide a wedge shaped receptacle for the gate generally indicated at 16. In this last case, the wedge opens toward the top of the valve, the smallest side of the wedge being adjacent the bottom of the valve.

The valve gate is a composite structure made up of a central annular member 17 and two flat plates 18 having faces thereon to engage the valve seat faces 15. Each plate is movably joined to the central annular member 17 by a flexible connection provided by a flexible metal annulus 21 joined to the peripheral edge of each plate 18 and to the annulus 17. A fluid passage 24 extends through the annulus 17 to permit fluid to be admitted and withdrawn to the fluid-tight chamber formed by plates 18 and the flexible annuli 21 together with the central annulus 17. Fluid under pressure is supplied to the fluid-tight chamber through passage 24 from a presently described source. If desired, one of the plates 18 can be omitted; in this case, positive pressure sealing, however, is only provided on one side of the valve.

To raise and lower the gate 16 a suitable hollow valve stem 31 is secured to the gate 16. The valve stem 31 extends upwardly through bonnet 20 secured to valve body 6 and through a bonnet extension 33 secured to the bonnet, the bonnet and the extension being of sufficient height to permit full opening of the gate valve. A packing gland indicated generally at 36 is provided in the bonnet extension about the valve stem as it issues from the bonnet.

In the form of the device shown, the upper end of the valve stem is threaded as at 37 to receive a nut 38 rotatably mounted in a bearing 39 formed at the upper end of a cage 41 secured to the upper end of bonnet extension 28. The lower end of the nut is below cage 41, and a retainer 43 is provided to hold the nut in position on the cage. To support the nut and rotate it, hand wheel 46 is secured to the nut through guard casing 63.

The end of valve stem 31 is formed to provide a cylinder in which a piston, generally indicated by numeral 58, is movable by the hand wheel, when the gate is in valve closing position, to force the gate members forcefully to engage the valve seats. The piston 58 includes a piston rod 59 having several pistons 60A and 60B thereon to reduce fluid leakage and to ensure positive action. The rod is slidable in a collar 61 secured into the end of the valve stem to provide a guide and a stop for upward piston movement. At its upper end, the piston rod carries an indicator 62 which extends above a guard casing 63 attached to the hand wheel as a protection to the piston rod. A plug 64 is also secured in position on the end of the piston rod, the plug being threaded to engage the hand wheel nut 38. To align the threads on the plug 64 and on the valve stem 31, a key 65 is secured to the piston rod by screw 66. Collar 61 is suitably relieved to pass the key for longitudinal movement (Figure 4). The plug is set on the piston in such relation to the threads on the valve stem that the plug is well engaged with hand wheel nut 38 before the valve stem is released. In fact, final closing of the valve is effected by reason of engagement of the plug threads with the hand wheel nut. Continued rotation of the hand wheel forces the piston to slide in the cylinder, as will appear.

To oppose movement of the piston rod, a first spring 67 is mounted between plug 64 and collar 61 and a second spring 68 is mounted between piston 60B and a support member 69 in the valve stem.

In operation, rotation of the hand wheel when the gate valve is in open position (Figure 1) is effective to move the valve stem toward valve closed position, plug 64 engaging the hand wheel nut finally to force the gate into the position shown in Figure 2. Further rotation results in the piston rod moving downwardly to force the liquid in the closed valve stem-gate system to move the valve members positively, movement of the plug compressing the springs. The position of rod 62 relative to the end of the casing indicates the closure of the valve, as in Figure 2.

To open the valve, an operator merely turns the hand wheel until the rod 62 is fully extended. The initial rotation releases the pressure on the valve member. Continued rotation returns the structure to its open position, as in Figure 1.

I claim:

1. A valve comprising a valve body having an inlet and an outlet, an inlet valve seat, an outlet valve seat, said seats being opposite each other and having substantially parallel faces, a gate movable between said seats to control the rate of fluid flow from said inlet to said outlet, a threaded stem adapted to be moved between a raised position and a depressed position to raise and lower said gate, said gate including a seating member on each side thereof for engagement with one of said seats, flexible sealing means supporting each seating member on said gate and forming a closed chamber with the seating members, a nut cooperatively positioned with respect to said stem, a hand wheel for rotating said nut to raise and lower said stem, and means for supplying fluid under pressure to said chamber to force said seating members into engagement with the valve seats, including a cylinder on an end of said valve stem and a piston movable by said nut and hand wheel to force fluid against said seating members to move said members against their respective seats.

2. A valve comprising a valve body having an inlet and an outlet, an inlet valve seat, an outlet valve seat, said seats being opposite each other and having substantially parallel faces, a gate movable between said seats to control the rate of fluid flow from said inlet to said outlet, a threaded stem adapted to be moved between a raised position and a depressed position to raise and lower said gate, said gate including a central annulus, a plate on each side of said annulus, a flexible annulus joining each plate to one side said central annulus, a threaded nut, means for rotating said nut on said stem, a fluid cylinder on an end of said valve stem, said valve stem having a fluid passage communicating with said annulus, and a piston movable in said cylinder and having a threaded portion for engagement with said nut.

3. A valve comprising a valve body having an inlet and an outlet, an inlet valve seat, an outlet valve seat, said seats being opposite each other and having substantially parallel faces, a gate movable between said seats to control the rate of fluid flow from said inlet to said outlet, a threaded stem adapted to be moved between a raised position and a depressed position to raise and lower said gate, said gate including a central annulus, a plate on a side of said annulus, a flexible annulus joining said plate to said central annulus, a nut, means for rotating said nut to raise and lower said stem, and means operable by said rotatable means only when said stem is in said depressed position to supply fluid to the chamber formed by said annulus and the plate and force said plate against a cooperatively positioned seat.

4. A valve comprising a valve body having an inlet and an outlet, an inlet valve seat, an outlet valve seat, said seats being opposite each other and having substantially parallel faces, a gate movable between said seats to control the rate of fluid flow from said inlet to said outlet, a threaded valve stem adapted to be moved between a raised position and a depressed position to raise and lower said gate, said gate including at least one seating member for sealing engagement with one of said seats, flexible sealing means supporting said member on said gate and forming a closed chamber with said member, a piston having a threaded portion thereon aligned with said threaded valve stem, a cylinder cooperating with said piston and in communication with said chamber, a nut rotatable on said threaded valve stem to raise and lower said stem, and rotatable on said piston in a lowered position of said valve stem to move the piston in said cylinder.

5. A valve comprising a valve body having an inlet and an outlet, an inlet valve seat, a outlet valve seat, said seats being opposite each other and having substantially parallel faces, a gate movable between said seats to control the rate of fluid flow from said inlet to said outlet, a threaded valve stem adapted to be moved between a raised position and a depressed position to raise and lower said gate, said gate including at least one seating member for sealing engagement with one of said seats, flexible sealing means supporting said member on said gate and forming a closed chamber with said member, said stem being hollow and including a cylinder formed in the upper end thereof, a piston mounted in said cylinder for sliding therein in one position of axial alignment, a threaded portion on said piston, a nut for engagement with said stem and said threaded portion, and means for rotating the nut to raise and lower the valve stem and to raise and lower the piston in the lower position of the valve stem.

6. A valve comprising a valve body, a valve seat therein, a valve gate movable between a valve seat engaging position and a valve seat disengaged position, a hollow valve stem slidably supported in said body and carrying said gate at one end thereof, said stem being threaded at its other end, a nut rotatably supported on said body in engagement with the thread on said valve stem, means for rotating said nut, a cylinder at said other valve stem end, a piston in said cylinder, and a threaded portion on said piston spaced from the threaded portion on said valve stem and adapted to be engaged with the thread in said nut before the thread on said valve stem becomes disengaged with the nut as the valve gate is moved to valve seat engaging position.

7. A valve comprising a valve body having a valve port therein providing a fluid passageway through the valve; a gate adapted to be moved between a valve port open position and a valve port closing position, said gate including a valve member adapted to be engaged with the valve body adjacent said port to close said port, flexible sealing means supporting said valve member on said gate and forming a closed chamber of variable capacity with said valve member; a cylinder in fluid communication with said chamber to supply and remove fluid therefrom to control movement of said valve member; a valve stem for raising and lowering said gate and including a threaded portion; a piston slidably mounted in said cylinder and including a threaded portion; and a nut adapted to be rotated with respect to said threaded portions, said threaded portions being in axial alignment and being adapted to be engaged in seriation by said nut, upon rotation thereof in one direction, to move said gate from valve port open position to valve port closing position and then to move said piston with respect to said cylinder to force fluid into said chamber and move said valve member into valve port closing position and, upon rotation of the nut in the opposite direction, to move said piston with respect to said cylinder to remove fluid from said chamber and move said valve member into valve port open position and then to move said gate from valve port closing position to valve port open position.

SAMUEL H. EDWARDS.

REFERENCES CITED

The following references are of record in the file of this patent:

UNITED STATES PATENTS

| Number | Name | Date |
|---|---|---|
| 1,957,807 | Robinson | May 8, 1934 |
| 2,325,802 | Schmidt | Aug. 3, 1943 |